(12) United States Patent
Zheng et al.

(10) Patent No.: US 12,499,776 B2
(45) Date of Patent: Dec. 16, 2025

(54) METHOD FOR WEATHER INFORMATION DISPLAY AND ADS-B/FIS-B WEATHER AND ADS-B TRACKS

(71) Applicant: Honeywell International Inc., Charlotte, NC (US)

(72) Inventors: Jinghua Zheng, Beijing (CN); Lin Wang, Beijing (CN)

(73) Assignee: Honeywell International Inc., Charlotte, NC (US)

( * ) Notice: Subject to any disclaimer, the term of this patent is extended or adjusted under 35 U.S.C. 154(b) by 194 days.

(21) Appl. No.: 18/319,941

(22) Filed: May 18, 2023

(65) Prior Publication Data

US 2024/0386802 A1   Nov. 21, 2024

(51) Int. Cl.
*G08G 5/76* (2025.01)
*G08G 5/21* (2025.01)
*G08G 5/26* (2025.01)
*G08G 5/34* (2025.01)

(52) U.S. Cl.
CPC .............. *G08G 5/76* (2025.01); *G08G 5/21* (2025.01); *G08G 5/26* (2025.01); *G08G 5/34* (2025.01)

(58) Field of Classification Search
CPC .. G08G 5/76; G08G 5/21; G08G 5/26; G08G 5/34; G08G 5/25; G08G 5/723; G08G 5/80; G01S 7/003; G01S 13/86; G01S 13/953

See application file for complete search history.

(56) References Cited

U.S. PATENT DOCUMENTS

| | | | |
|---|---|---|---|
| 7,808,377 | B2 | 10/2010 | Shafaat et al. |
| 8,004,452 | B2 | 8/2011 | Rolfe et al. |
| 8,892,349 | B2 | 11/2014 | Estkowski et al. |
| 9,037,319 | B2 | 5/2015 | Conner et al. |

(Continued)

FOREIGN PATENT DOCUMENTS

| | | |
|---|---|---|
| EP | 2296128 A1 | 3/2011 |
| EP | 3862786 A1 | 8/2021 |

(Continued)

OTHER PUBLICATIONS

Extended Search Report from counterpart European Application No. 24172561.3 dated Jan. 14, 2025, 12 pp.

(Continued)

*Primary Examiner* — James J Lee
*Assistant Examiner* — Andrew Sang Kim
(74) *Attorney, Agent, or Firm* — Shumaker & Sieffert, P.A.

(57) ABSTRACT

Systems, methods, and devices for receiving information from several different sources affecting an aircraft flight path. Processing circuitry may fuse that information, and based on analysis of the fused information, automatically determining whether to adjust a planned flight path for an own ship aircraft. The processing circuitry may connect to a user interface, and in response to determining the to adjust the flight path of the own ship aircraft, may output a depiction of the recommended adjusted flight path for use by the aircraft operator. The aircraft operator may determine, based on the recommendation, whether the own ship aircraft should adjust the planned flight path. In some examples, the aircraft operator may request a flight path deviation from air traffic control before changing course or altitude.

18 Claims, 4 Drawing Sheets

(56) References Cited

U.S. PATENT DOCUMENTS

| | | |
|---|---|---|
| 9,810,770 B1 | 11/2017 | Weichbrod et al. |
| 9,952,310 B2 | 4/2018 | Wang et al. |
| 10,241,203 B2 | 3/2019 | Kauffman et al. |
| 10,700,767 B2 | 6/2020 | Wang et al. |
| 11,588,543 B2 | 2/2023 | Wang et al. |
| 2003/0004641 A1 | 1/2003 | Corwin et al. |
| 2011/0282582 A1 | 11/2011 | Stayton et al. |
| 2013/0027226 A1 | 1/2013 | Cabos |
| 2016/0266249 A1* | 9/2016 | Kauffman ............... G08G 5/22 |
| 2017/0030734 A1 | 2/2017 | Shafaat et al. |
| 2017/0038457 A1 | 2/2017 | Wang et al. |
| 2018/0047294 A1 | 2/2018 | Esposito |
| 2020/0258403 A1 | 8/2020 | Rathi et al. |
| 2020/0295821 A1 | 9/2020 | Wang et al. |
| 2021/0090445 A1* | 3/2021 | Molnar ................. G08G 5/76 |
| 2021/0350716 A1 | 11/2021 | Gariel et al. |
| 2023/0093761 A1 | 3/2023 | Krenz et al. |
| 2023/0386346 A1* | 11/2023 | Schwartz ............... G08G 5/76 |

FOREIGN PATENT DOCUMENTS

| | | |
|---|---|---|
| KR | 20090069412 A | 7/2009 |
| KR | 20130049365 A | 5/2013 |
| KR | 101296462 B1 | 8/2013 |

OTHER PUBLICATIONS

Response to Extended Search Report dated Oct. 14, 2024, from counterpart European Application No. 24172561.3 filed Nov. 7, 2024, 2 pp.

Extended Search Report from counterpart European Application No. 24172561.3 dated Oct. 14, 2024, 15 pp.

Response to Extended Search Report dated Jan. 14, 2025, from counterpart European Application No. 24172561.3 filed Aug. 11, 2025, 24 pp.

* cited by examiner

ововICAL FIELD

METHOD FOR WEATHER INFORMATION DISPLAY AND ADS-B/FIS-B WEATHER AND ADS-B TRACKS

TECHNICAL FIELD

The disclosure relates to aircraft avionics and more specifically to aircraft systems that display information to aircraft operators.

BACKGROUND

Aircraft, both manned and unmanned, may reroute planned flight paths based on changing conditions, such as predicted or actual weather conditions including turbulence, smoke, volcanic ash, and other conditions affecting flight.

SUMMARY

In general, the disclosure describes systems, methods, and devices for receiving information affecting a flight path from several different sources, fusing that information together, and based on analysis of the fused information, automatically determining whether an own ship aircraft should adjust a planned flight path. Some examples of information sources may include an own ship weather radar system, automatic dependent surveillance-broadcast (ADS-B), flight information system broadcast (FIS-B), global position system (GPS), data from an own ship flight management computer (FMC), other onboard or ground based sensors and similar sources. Examples of systems or devices that may receive, fuse, and analyze the fused information may include processing circuitry that is part of an aircraft avionics system as well as a standalone device such as a tablet computer running an electronic flight bag (EFB) application. The processing circuitry may connect to a user interface, including a display, and in response to determining the own ship aircraft should adjust the planned flight path, may output a depiction of the recommended adjusted flight path for use by the aircraft operator.

In one example, this disclosure describes a system comprising: a weather radar configured to be installed on board an own ship aircraft; processing circuitry for the own ship aircraft having access to a storage device, the processing circuitry and storage device configured to: receive, from multiple sources, information related to a planned flight path of the own ship aircraft, wherein the multiple sources include the weather radar, first data received from a flight information system broadcast (FIS-B) service, and second data received from automatic dependent surveillance-broadcast (ADS-B); evaluate the received information; based on the evaluation of the received information, automatically determine whether the own ship aircraft should adjust the planned flight path; output, via a user interface, a depiction of an adjusted flight path to flight crew for the own ship aircraft.

In another example, this disclosure describes a method comprising receiving, by processing circuitry for an aircraft, information from multiple sources related to a planned flight path of the aircraft, wherein the multiple sources include a weather radar located onboard the aircraft, first data received from a flight information system broadcast (FIS-B) service, and second data received from automatic dependent surveillance-broadcast (ADS-B); evaluating the received information; based on the evaluation of the received information, automatically determining whether the own ship aircraft should adjust the planned flight path; and outputting, via a user interface, a depiction of an adjusted flight path to flight crew for the own ship aircraft.

In another example, this disclosure describes a non-transitory computer-readable storage medium comprising instructions that, when executed, cause processing circuitry of a computing device to receive information from multiple sources related to a planned flight path of the aircraft, wherein the multiple sources include a weather radar located onboard the aircraft, first data received from a flight information system broadcast (FIS-B) service, and second data received from automatic dependent surveillance-broadcast (ADS-B); evaluate the received information; based on the evaluation of the received information, automatically determine whether the own ship aircraft should adjust the planned flight path; and output, via a user interface, a depiction of an adjusted flight path to flight crew for the own ship aircraft.

The details of one or more examples are set forth in the accompanying drawings and the description below. Other features, objects, and advantages will be apparent from the description, drawings, and claims.

DETAILED DESCRIPTION

The disclosure describes systems, methods, and devices for receiving information from several different sources affecting an aircraft flight path. Processing circuitry may fuse that information, and based on analysis of the fused information, automatically determining whether to adjust a planned flight path for an own ship aircraft. Some examples of information sources may include an own ship weather radar system, automatic dependent surveillance-broadcast (ADS-B), flight information system broadcast (FIS-B), global position system (GPS), data from an own ship flight management computer (FMC), other onboard or land based sensors and similar sources.

Examples of systems or devices that may receive, fuse, and analyze the fused information may include processing circuitry that is part of an aircraft avionics system as well as processing circuitry of a standalone device such as a tablet computer running an electronic flight bag (EFB) application. The processing circuitry may receive the information via wired or wireless communication. The processing circuitry may also connect to a user interface, including a display, and in response to determining the own ship aircraft should adjust the planned flight path, may output a depiction of the recommended adjusted flight path for use by the aircraft operator. The aircraft operator may include the flight crew on board a manned aircraft, or flight crew of an unmanned aircraft controlling the unmanned aircraft from a remote location. The aircraft operator may determine, based on the recommendation, whether the own ship aircraft should adjust the planned flight path. In some examples, the aircraft operator may request a flight path deviation from air traffic control before changing course or altitude.

Figure 1:
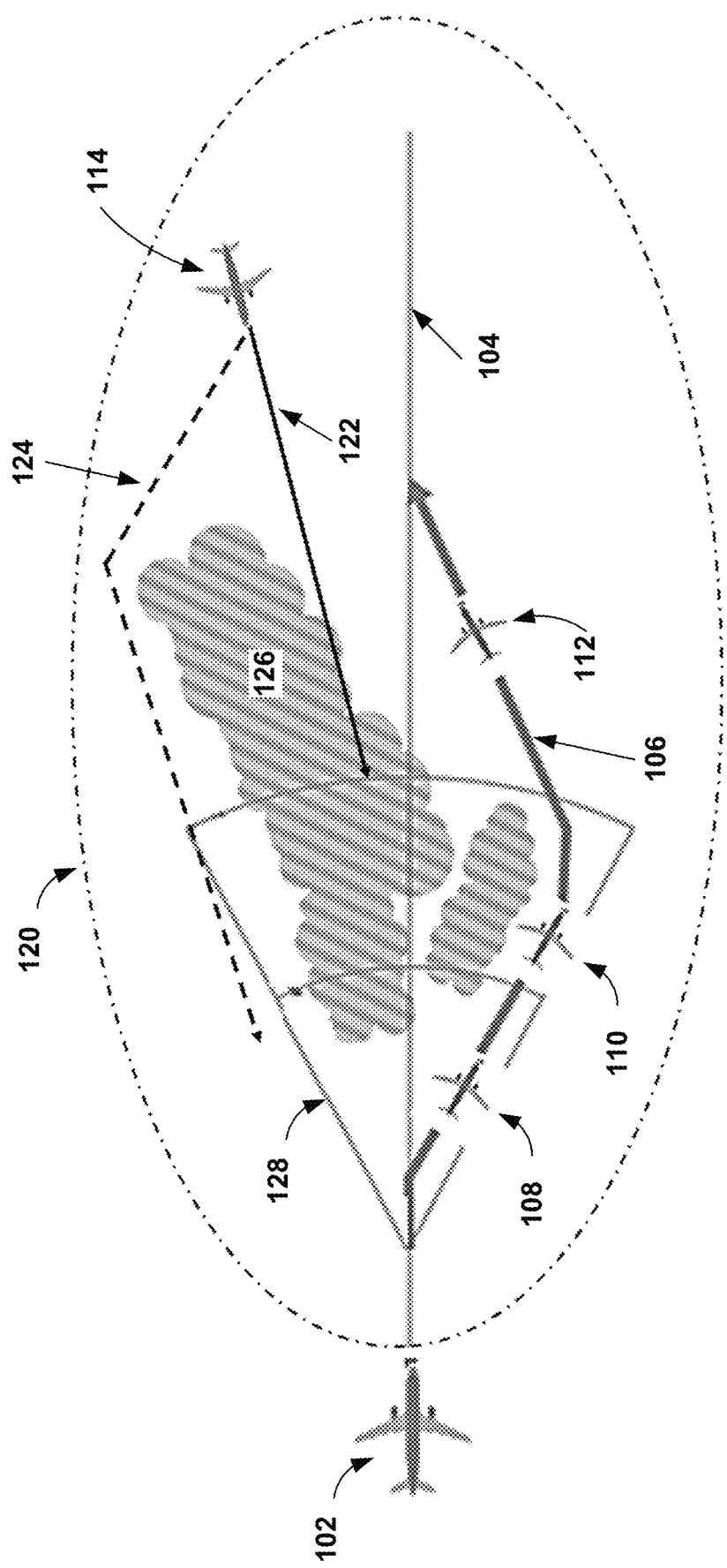
FIG. 1 is a conceptual diagram illustrating an example operation of the system of this disclosure.

FIG. 1 is a conceptual diagram illustrating an example operation of an example system of this disclosure. FIG. 1 includes own ship aircraft 102, which may be a manned or unmanned aircraft. Own ship aircraft 102 is on a planned flight path 104, which may include one or more legs to reach a final destination (not shown in FIG. 1) for own ship aircraft 102.

FIG. 1 also illustrates other aircraft 108, 110, 112 and 114 that may be in a three dimensional (3D) region of airspace 120 through which the own ship planned flight path 104 passes. For example, aircraft 108, 110 and 112 may be traveling on the same or similar flight trajectory as own ship aircraft 102. In this disclosure, a similar flight trajectory may be a flight path through the same region of air space. For example, an aircraft flying from LaGuardia Airport (KLGA) in New York U.S.A. to Heathrow (LHR) in London may fly along a similar flight trajectory to an aircraft flying from LaGuardia to Schiphol (AMS) in Amsterdam. Similarly, an aircraft flying from Berlin (BER) in Germany to Beijing Capital International Airport (PEK) may fly a similar flight trajectory to an aircraft flying from Schiphol to Narita International Airport (NRT) in Tokyo Japan.

FIG. 1 also illustrates aircraft 114 flying a similar flight trajectory 122 as planned flight path 104 for own ship aircraft 102, but in approximately an opposite direction, where "approximately" the opposite direction in this disclosure means within 90 degrees of the reciprocal course or heading. For example, if own ship aircraft planned flight path course is 090 degrees (east), the reciprocal course is 270 degrees (west) and within 90 degrees of 270, e.g., 315 degrees to 235 degrees may be considered "approximately" the opposite direction.

Any of the aircraft in 3D region of airspace 120 as shown in the example of FIG. 1 may be affected by the same flight conditions, such as storm 126, that may affect own ship aircraft 102. Other examples of conditions affecting flight may include a restricted flight area such as a temporary flight restriction (TFR), predicted or actual weather conditions including turbulence, smoke, volcanic ash, and similar conditions.

In some examples, own ship aircraft 102 may operate using a computing system with processing circuitry (not shown in FIG. 1) that may receive information from multiple sources related to planned flight path 104. Some examples of sources may include the flight path programmed into the own-ship flight management system (FMS), information from air traffic control (ATC), which in some examples may be received automatically such as via Controller Pilot Data Link Communications (CPDLC), and other sources. CPDLC is a means of communication between controller and pilot, using data link for ATC communications. In some examples, own ship aircraft 102 may include onboard weather radar that may have a field of view 128 (FOV) along planned flight path 104 and may detect and warn the flight crew of conditions affecting flight. Some examples of conditions affecting flight detectable by radar may include turbulence, predictive hail, predictive lightning, storm cell tracking and trending, predictive windshear (PWS), and weather reflectivity, which may be used by the weather radar system to determine other weather conditions. In some examples, a weather radar may include a rain echo attenuation compensation technique (REACT) capability. As the transmitted radar signal travels through heavy rain the radar signal may lose power or become attenuated. If this attenuation is severe enough, weather behind a storm cell may not be detectable, or it may be displayed as being less severe than it actually is. So the pilots may not be able to get the timely warning of the severe weather. In this disclosure, "severe weather" is weather that may be dangerous, or uncomfortable, for an aircraft, or passengers aboard the aircraft. REACT may detect attenuation by measuring the intensity of the signals and highlighting the areas where the interpreted weather is doubtful.

The processing circuitry may also receive, for example, information from FIS-B and from ADS-B. ADS-B is a system for aircraft and other vehicles to automatically transmit and receive data that includes identification, position, heading, speed, and additional data, by broadcast via a data link. ADS-B may also provide weather information to aircraft and other vehicles. ADS-B data may be received, for example, directly from other aircraft or vehicles and may also be broadcast from ground stations.

FIS-B is a service available to aircraft who can receive data over 978 MHZ (UAT). FIS-B automatically transmits a wide range of weather products with national and regional focus to all equipped aircraft. FIS-B is a data broadcasting service that works along with ADS-B to allow aircraft operators to receive aeronautical information such as weather and airspace restrictions through a data link. In some examples, FIS-B may gather information through the use of ground stations and radar and delivers that data in the form of weather alerts, airport information and other reports. Some examples of weather alerts may include inflight weather advisories for significant meteorological hazards (SIGMET) and airman's meteorological information (AIRMET). Some examples of information included in SIGMETs and AIRMETs include turbulence predictions, visibility restrictions, icing conditions, thunderstorm predictions, dust, volcanic ash, and other hazards to flight. Other details on weather and other information that the processing circuitry of this disclosure may receive can be found in Minimum Operational Performance Standards (e.g., MOPS DO-260C).

Other sources of information may include more comprehensive weather information from formatted reports that may be interpreted by the processing circuitry. Some examples of such reports include aircraft reports such as AIREP and pilot reports (PIREPS). Aircraft reports are reports of actual weather conditions encountered by an aircraft while in flight. There are two types of reports. An AIREP is a routine, often automated report of in-flight weather conditions such as wind, temperature, eddy dissipation rate (EDR), which is related to clear air turbulence (CAT) and other weather information. A PIREP is reported by a pilot to report encounters of actual weather conditions through which the aircraft is flying, such as icing or turbulence, height of cloud tops, base of clouds, wind speed and direction aloft, and other conditions. Both reports may be transmitted in real-time via radio to a ground station and may be made available to other aircraft in flight. The processing circuitry may also receive information from other sources such as global positioning system (GPS), the FMC, other onboard sensors such as temperature sensors, gyroscopes, and accelerometers to measure motion, and other sources. Each aircraft report may include the type of aircraft making the report. For example, light turbulence for a commercial multi-engine passenger jet may feel like heavy turbulence to a smaller aircraft.

The processing circuitry may fuse this information into a cohesive picture. For example, for areas in which the weather radar signal is attenuated and REACT highlights that area as doubtful, the processing circuitry may combine FIS-B weather information in those doubtful areas, to complete, or at least improve, the reference information for that area. This fused information may provide supplementary weather information for flight crew awareness.

Other supplementary weather information may come from aircraft on the same or similar trajectory as own ship aircraft 102. For example, own ship aircraft 102 may receive information that aircraft 110 had to change its original flight path, e.g., from parallel to flight path 104, to a new flight path 106. Because aircraft 110 is in the same region of airspace 120 as the planned flight path of own ship aircraft 102, receiving data that aircraft 110 made a course and flight path change may be useful supplementary weather information to own ship aircraft 102. In some examples, own ship aircraft 102 may receive the indication that aircraft 110 changed course from ADS-B. In some examples, the onboard weather radar may indicate improved weather, e.g., with REACT, but the ahead aircraft ADS-B are all indicating the ahead aircraft changed flight path. Though an onboard weather radar may have a higher confidence priority in determining whether to change course, an indication that many or most aircraft ahead are changing course, may give a higher confidence to the ADS-B data.

The processing circuitry may evaluate a large volume of data from the numerous sources, fuse the information together and evaluate the information and based on the evaluation, automatically determine whether own ship aircraft 102 should adjust the planned flight path. In some examples, the processing circuitry may output, via a user interface, a depiction of an adjusted flight path to the own ship aircraft flight crew. The flight crew may then decide whether to follow the recommended adjusted flight path and contact flight operations and/or air traffic control (ATC) to request a change.

The system of this disclosure may be an improvement and provide advantages over other systems that evaluate weather and other flight conditions. For example, the system of this disclosure may reduce the flight crew workload by receiving the data from the various sources and fusing the information into a cohesive whole picture of the planned flight. Processing circuitry of the system of this disclosure may regularly, or continuously, evaluate the received information, as well as received updates to information affecting the flight of own ship aircraft 102. For example, the system of this disclosure may determine that each of aircraft 108 and 112, in addition to aircraft 110 all changed planned flight paths because of storm 126. The processing circuitry of this disclosure may further determine that aircraft 114, coming approximately the opposite direction, changed the flight path from 122 to a new flight path 124, also because of storm 126. This supplementary weather information, when fused with the other received information by the processing circuitry may cause the processing circuitry to automatically determine that own ship aircraft 102 should also adjust the flight path to, for example, flight path 106.

In other examples, other examples (not shown in FIG. 1) only aircraft 112 may have adjusted its flight path from an original flight path to flight path 106. For example, aircraft 108 and 110 may have maintained their original flight path, which may indicate that storm 126 has moved or is dissipating and may no longer be a hazard. In this manner the system of this disclosure may satisfy a long felt, but unmet need for flight safety, which includes reducing the workload of the flight crew.

Figure 2:
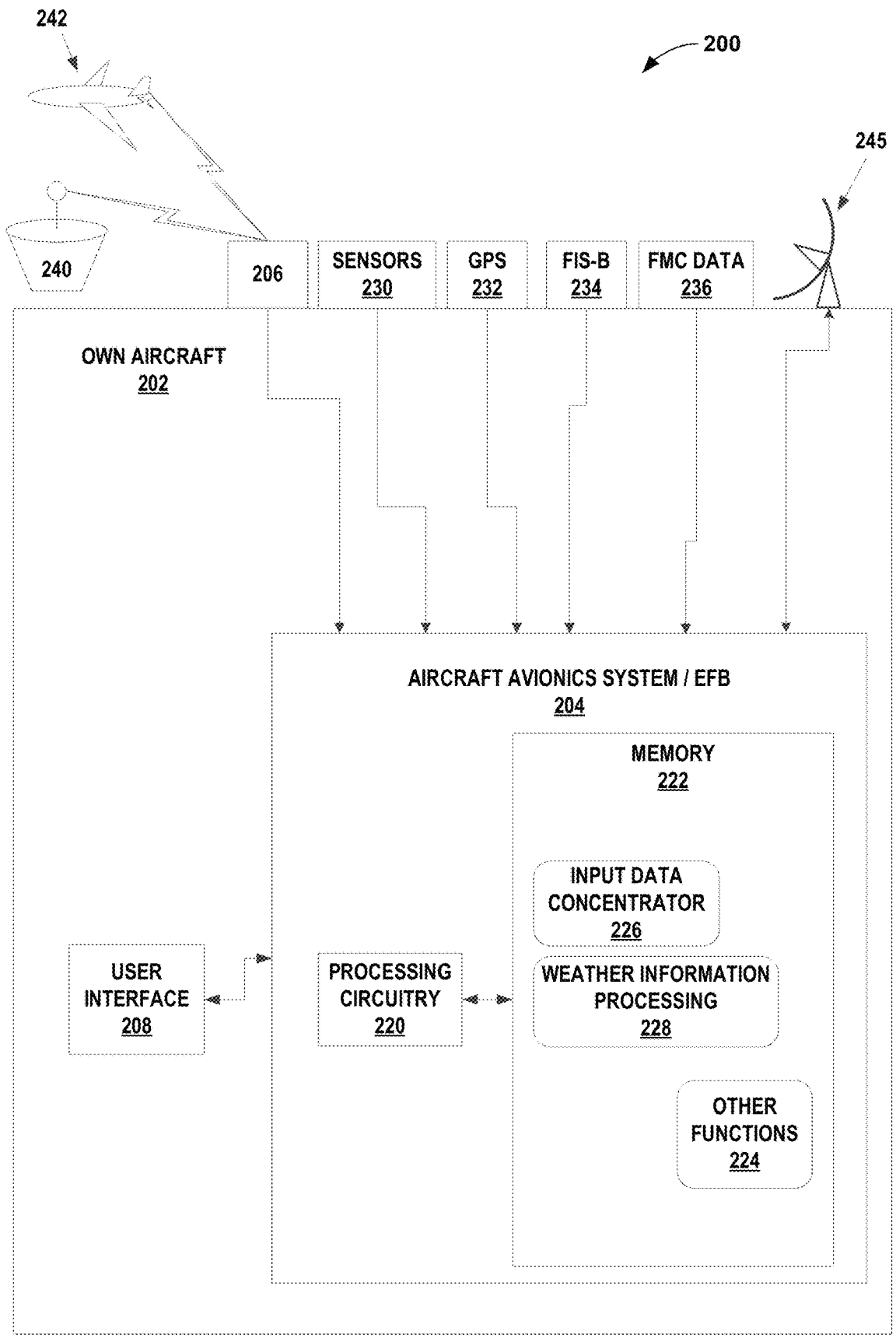
FIG. 2 is a block diagram illustrating an example system for receiving, fusing, and evaluating information from numerous sources, according to one or more techniques of this disclosure.

FIG. 2 is a block diagram illustrating an example system for receiving, fusing, and evaluating information from numerous sources, according to one or more techniques of this disclosure. The example of system 200 in FIG. 2 includes own aircraft 202 with antenna 206 configured to receive ADS-B signals and/or interrogation replies directly from other vehicles, e.g., aircraft or UAV 242, or via ground station 240, which is the same or similar to the functions of own ship aircraft 102 described in FIG. 1.

In some examples, the information gathering, fusing, evaluation and recommendation functions described above in relation to FIG. 1 may be executed by an electronic flight bag (EFB 204), which may be a tablet computer, or similar computing device with processing circuitry 220, memory 222 and user interface 208. An EFB is one or more applications, comprising programming instructions executed by processing circuitry 220, that may retrieve and display reference material often found in the pilot's carry-on flight bag, including the flight-crew operating manual, navigational charts, and other material. In addition, the EFB include software applications to automate other functions such as take-off performance calculations. Some examples of EFBs may include Jeppesen® Aviator, ForeFlight® and other similar EFB applications. In the example of FIG. 2, the computing device executing EFB 204 may receive information from the various sources via a wireless connection or a wired connection.

Figure 3:
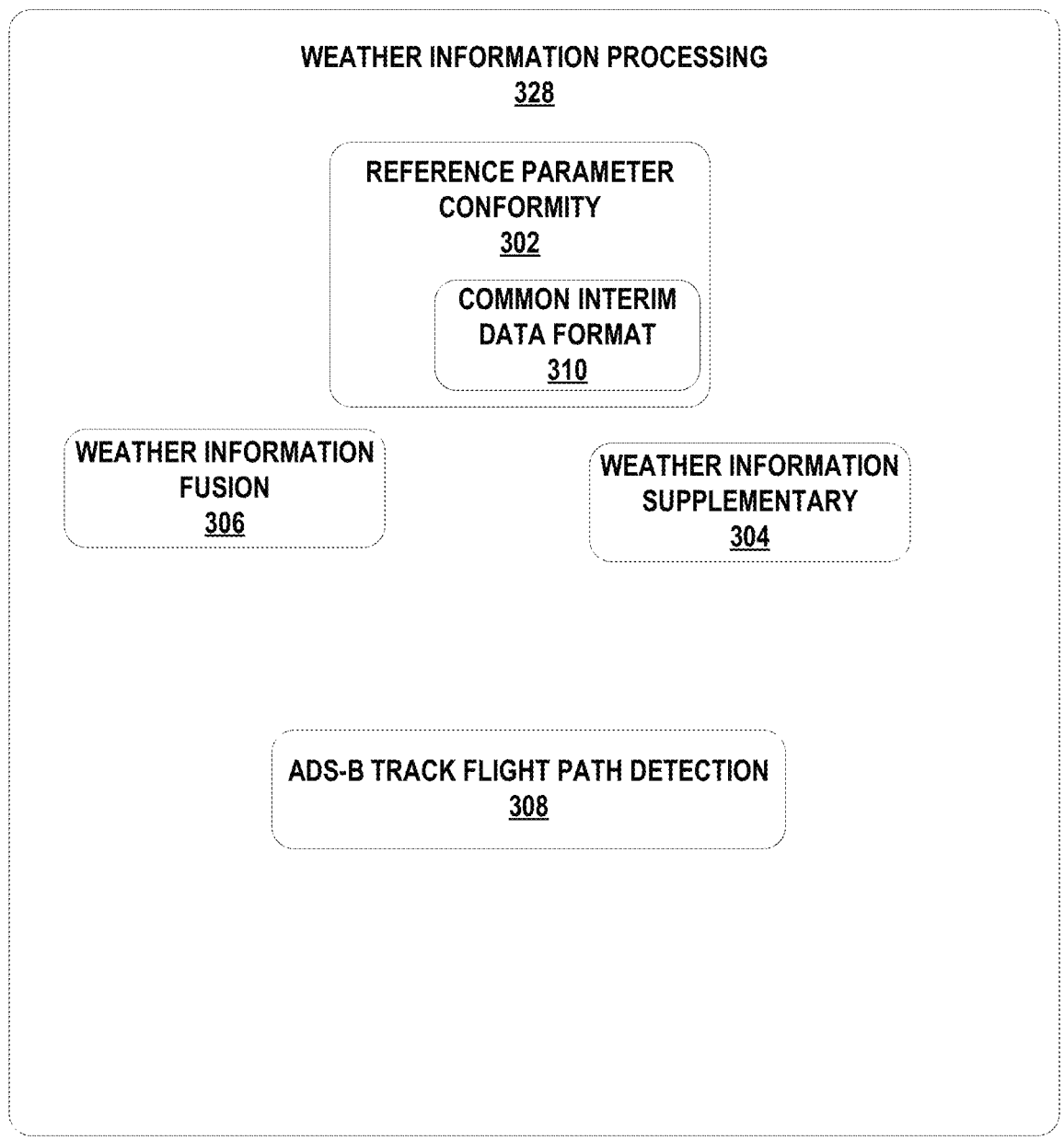
FIG. 3 is a block diagram illustrating additional details of the weather information processing of this disclosure.

In other examples, own aircraft 202 includes aircraft avionics system 204, which may be implemented as a computing device with processing circuitry 220, memory 222 as well as other sensors, controllers, actuators, and so on not shown FIG. 3. In FIG. 2, EFB 204 and aircraft avionics 204 are shown as a single system, but in some implementations may be fully or partially separate systems. In some examples EFB 204 may receive information from aircraft avionics 204, as well as from other sources. In some examples aircraft avionics system 204 may be located on board the aircraft. In other examples, such as in the example of a UAV, aircraft avionics 204 may be located at a ground station, a ground vehicle, a waterborne vessel or otherwise off the aircraft. In other words, the processing circuitry for the aircraft may be onboard, may be off the aircraft or may have components both onboard and off the aircraft.

Aircraft avionics system 204 may connect to one or more user interfaces 208. User interfaces 208 may display information as well as receive input from the flight crew. In some examples, in addition to an EFB, or as an alternative, memory 222 may be part of aircraft avionics system 204, and may include programming instructions that when executed by processing circuitry 220, may perform the functions described herein, and as described above in relation to FIG. 1. In other words, the instructions for performing the functions of this disclosure may be implemented as a hardware device with embedded software that can be connected securely to the cloud via wired or wireless connection as well as embedded software that runs in a device/unit (e.g., firmware).

Additional examples of information sources from which processing circuitry 220 may receive information to perform the functions of this disclosure may include GPS 232, FIS-B 234, FMC data 236, radar 245 and sensors 230, as described above in relation to FIG. 1. Radar 245 may include a weather radar with a FOV positioned along the heading of own aircraft 202. Sensors 230 are an example of the sensors described above in FIG. 1 including temperature, e.g., an outside temperature sensor, a turbulence sensor, a barometric air pressure sensor and other sensors. Processing circuitry 220 may also receive weather information from one or more satellite based weather providers, such as SiriusXM or similar system (not shown in FIG. 2).

Along with the traffic information system-broadcast (TIS-B), FIS-B 234 is available to ADS-B equipped vehicles as part of the FAA's next generation air transportation system (NextGen). TIS-B is an aviation information service that may allow aircraft and other vehicle operators to be aware of aircraft that are not emitting ADS-B data but have may a basic transponder.

As noted above in relation to FIG. 1, FMC data 236 may come from an FMC that is part of a flight management system (FMS). In some examples, an FMS comprises four main components: The flight management computer (FMC), described in relation to FIG. 1; the automatic flight control or automatic flight guidance system (AFCS or AFGS); the aircraft navigation system; and an electronic flight instrument system (EFIS) or equivalent electromechanical instrumentation. In some examples, the FMC is a computer system that uses a large database to allow routes to be pre-programmed and fed into the system by means of a data loader.

In some examples, antenna 206 may be configured as a directional antenna, and in other examples, antenna 206 may be an integrated antenna system that includes both directional antenna functions as well as omni-directional capability. In some examples own aircraft 202 may include a separate directional antenna and omni-directional antenna where the omni-directional antenna receives and broadcasts ADS-B messages (not shown in FIG. 2).

In some examples, memory 222 may store programming instructions at a memory location within memory 222 that when executed, cause one or more processors of processing circuitry 220 of aircraft avionics system 204, or EFB 204, to perform the functions of this disclosure described above in relation to FIG. 1. Processing circuitry 220 may also execute programming instructions to perform other functions 224, which may include airborne collision avoidance (ACAS), ADS-B IN and OUT functions, communication functions, flight management, navigation, cabin air quality and pressure control, engine and other systems controls and other functions (not shown in FIG. 2).

Processing circuitry 220 is an example of the processing circuitry described above in relation to FIG. 1 and may be implemented as any one or more of a microcontroller (MCU), e.g. a computer on a single integrated circuit containing a processor core, memory, and programmable input/output peripherals, a microprocessor (µP), e.g. a central processing unit (CPU) on a single integrated circuit (IC), a controller, a digital signal processor (DSP), an application specific integrated circuit (ASIC), a field-programmable gate array (FPGA), a system on chip (SoC) or equivalent discrete or integrated logic circuitry. A processor may be integrated circuitry, i.e., integrated processing circuitry, and that the integrated processing circuitry may be realized as fixed hardware processing circuitry, programmable processing circuitry and/or a combination of both fixed and programmable processing circuitry. Accordingly, the terms "processing circuitry," "processor" or "controller," as used herein, may refer to any one or more of the foregoing structures or any other structure operable to perform techniques described herein.

Examples of memory 222 may include any type of non-transitory computer-readable storage media, such as random access memory (RAM), read only memory (ROM), programmable read only memory (PROM), erasable programmable read only memory (EPROM), one-time programmable (OTP) memory, electronically erasable programmable read only memory (EEPROM), flash memory, or another type of volatile or non-volatile memory device. In some examples the computer readable storage media may store instructions that cause processing circuitry 220 to execute the functions described herein. In some examples, the computer readable storage media may store data, such as configuration information, temporary values and other types of data used to perform the functions of this disclosure at a memory location of memory 222.

In the example of FIG. 2, memory 222 may include programming instructions that cause processing circuitry 220 to perform input data concentration, input data concentrator 226, and weather information processing functions 228, as described above and in relation to FIG. 1. For example, weather information processing 228 may determine that a specific aircraft like 108, 110, 112 depicted in FIG. 1, is on the same or similar flight path via correlating tracked aircraft ADS-B Position data (determined by the transmitted state vector and an ADS-B integrity/accuracy parameter) with the own-ship flight path to determine if the other specific aircraft are on the same flight path of own-ship or not. In addition to state vector, e.g., position, heading and speed, the ADS-B data package may also include integrity and accuracy parameters. In some examples, the ADS-B data package may include navigation integrity (NIC), and navigation accuracy information, e.g., $NAC_P$, which indicates navigation accuracy category for position and $NAC_V$, which indicates navigation accuracy category for velocity. Processing circuitry 220 may include the integrity and accuracy of the received ADS-B information in determining whether other aircraft actually deviated from its flight path, or just appears to have deviated because the ADS-B data may be inaccurate.

FIG. 3 is a block diagram illustrating additional details of the weather information processing of this disclosure. Weather information processing 328 is an example of weather information processing function of memory 222 described above in relation to FIG. 2. Weather information processing 328 may store programming instructions that may cause processing circuitry of this disclosure to execute the functions described herein.

In the example of FIG. 3, weather information processing 328 includes reference parameter conformity 302, weather information supplementary 304 and weather information fusion 306 and ADS-B track flight path detection 308. The blocks of FIG. 3 are just one example implementation of the functions of this disclosure, and used to simplify the description. In other examples, the functions may be divided and/or combined in a different manner.

Reference parameter conformity 302 may include programming instructions that cause processing circuitry of this disclosure, e.g., processing circuitry 220 of FIG. 2, to check the received information against parameters for the own ship aircraft, e.g., own ship aircraft 102 of FIG. 1. For example, the processing circuitry may receive numerous information packets from FIS-B, compare the received information with timing, altitude, course, speed, planned flight path and other parameters of the own ship aircraft to determine which of the received FIS-B packets may affect the planned flight path of the own ship aircraft.

In some examples, reference parameter conformity 302 may discard information that applies to a region through which the own ship planned flight path may not pass. However, should the system of this disclosure recommend a flight path change, the processing circuitry may consider information formerly discarded by reference parameter conformity 302 to determine the adjusted flight path. For example, received information may not apply to the current planned flight path, but may affect a possible alternative flight path. The received information may be ignored for the current flight path, but used to determine the adjusted flight path, e.g., to ensure the adjusted flight path avoids possible hazardous weather that may not have affected the original planned flight path.

In some examples, weather information processing 328 may correlate each received data parameters with priority for the associated weather data source. Reference parameter conformity 302 may retrieve the relative weather data from multiple sources with own aircraft interest area on flight path ahead (latitude/longitude/alt), and also timing validation. For example, a FIS-B report may provide the weather info with timing parameter so the system may determine if the weather information is too old to be useful.

Other functions of weather information processing 328 may include prioritizing the overlap data from multiple sources that provide information for the area of interest, e.g., region of airspace 120 through which the own ship planned flight path 104 passes as described above in relation to FIG. 1. Weather information processing 328, such as the functions within weather information supplementary 304 may complement and fill in any gaps the data, such as if the weather radar 3D data buffer does not have information in a certain sector of the area of interest, but other sources may have, as described above in relation to FIG. 1.

If two sources have the same data input, weather information processing 328 may also prioritize a data source for the weather information fusion 306 function. In some examples, the own ship weather radar 3D data parameter may have a higher confidence score than other sources. In some examples, ADS-B parameters may have lower confidence priority than the onboard weather radar but higher confidence than FIS-B data. Said another way, received aircraft 1090 Mhz ADS-B weather parameter and/or UAT ADS-B weather parameters may have higher priority than UAT FIS-B data parameters.

However, as described above in relation to FIG. 1, in some examples, the onboard weather radar may indicate improved weather, e.g., with REACT, but the ahead aircraft ADS-B are all indicating the ahead aircraft changed flight path. Though an onboard weather radar may have a higher confidence priority in determining whether to change course, an indication that many or most aircraft ahead are changing course, may give a higher confidence to the ADS-B data.

In some examples, reference parameter conformity 302 may convert the received first data and second data into common interim data format 310. The common interim data format 310 may optimize the weather information fusion 306, weather information supplementary 304 and ADS-B track flight detection 308 functions. For example, the processing circuitry may receive air traffic service (ATS) information in ASTERIX format. ASTERIX, which is short for All Purpose Structured Eurocontrol Surveillance Information Exchange, is a standard for the exchange of ATS information. ASTERIX is a surveillance data format with a number of different categories, each of which deals with one particular kind of information. These may include target reports from sensors such as air traffic radars as well as processed information such as aircraft tracks and various system status messages. Some aspects of ASTERIX may be included in MOPS DO-260, described above in relation to FIG. 1

However, the common interim data format 310 of this disclosure, may convert ASTERIX, or other data formats, into a data format so that weather information processing 328 may also process information from weather radar 245, and information from sensors 230 such as temperature, pressure, turbulence. For example, weather fusion information 306 may more easily and accurately process the numerous packets of information from the variety of sources when the information is converted into common interim data format 310. In other words, the processing circuitry may fuse this information into a cohesive picture and evaluate the received information based on the common interim data format. The fused information may provide supplementary weather information for flight crew awareness as described above in relation to FIG. 1.

In some examples, weather information fusion 306 may also cross-check received information for consistency. For example, the processing circuitry executing weather information fusion 306 may receive information from a source that may conflict with other sources. Weather information fusion 306 may include comparison, voting, and other functions to resolve such conflicts to determine a cohesive weather picture. In some examples, some sources may have priority over other sources. For example, an onboard weather radar that indicates precipitation in the planned flight path may override another source that indicates clear air in the planned flight path.

Programming instructions located at ADS-B track flight path detection 308, as described above in relation to FIG. 1, may cause the processing circuitry to receive, via for example, ADS-B, a track for an aircraft different from the own ship aircraft. The processing circuitry may determine whether the track for the other aircraft is a deviation from an original track for the other aircraft. The processing circuitry may similarly evaluate many of the tracks for the hundreds of aircraft enroute along their respective flight paths during the same period that the own ship aircraft is traveling on the planned flight path for the own ship aircraft. The processing circuitry may automatically determine whether the own ship aircraft should adjust the planned flight path based on the determined deviation for the other aircraft, as described in FIG. 1. In some examples, the automatic determination of whether to adjust the own ship planned flight path may consider the determined hazard weather data fused from 306 in the airspace ahead on the planned flight path. Weather information processing 328 may also consider a determined deviation for the other aircraft that has been tracked on the same flight path from ADS-B flight path detection 308, which was also described above in relation to FIGS. 1 and 2.

In some examples, the own ship aircraft's planned flight path could be received from an onboard avionic system like an FMC, ATC procedure via the Aircraft Communication Addressing and Reporting System (ACARS), or CDPLC via the own ship aircraft communication management unit (CMU). ADS-B track flight path detection 308 may determine whether other aircraft are on the same planned flight path as the own ship aircraft in a variety of different ways. One possible example may include calculating then detecting another aircraft's flight path and a deviation from the flight path by tracking in-trail ahead aircraft's ADS-B broadcasted data or from another avionic source like processing circuitry executing Traffic Alert and Collision Avoidance System (TCAS). ADS-B track flight path detection 308 may correlate the on-tracked position data for the in-trail ahead aircraft with own ship planned flight path to determine if the ahead aircraft is on same planned flight path.

In some examples, the processing circuitry may cause a display unit of a user interface to output a depiction of an adjusted flight path to flight crew for the own ship aircraft. The flight crew may determine whether to adjust the flight path for the aircraft based on the depiction. In some examples, the depiction may be graphical view of the adjusted flight path, and may include the location of the associated causes for the adjustment, e.g., hazardous weather. In other examples, the depiction may be a list of upcoming waypoints, along with course, speed, and altitude between the waypoints.

In other examples, the display of the adjusted flight path may be similar to the cockpit display of traffic information (CDTI). For the CDTI, processing circuitry for the display may determine the "own-aircraft" position a GPS receiver. The ADS-B antenna and receiver circuitry may detect extended squitter ADS-B signals from other aircraft and ground stations, as described above in relation to FIG. 2. The processing circuitry may decode the raw messages to determine the identity, position (latitude, longitude), altitude, and velocity of detected aircraft. It then presents symbols on the display depicting other aircraft in relation to the own ship aircraft. Similarly, the user interface for the system of this disclosure, e.g., a display connected to aircraft avionics or an EFB, may present symbology indicating detected hazards, in some examples, information regarding aircraft traveling along a similar trajectory that have changed course, as well as an indication of the automatically determined adjusted flight path.

Figure 4:
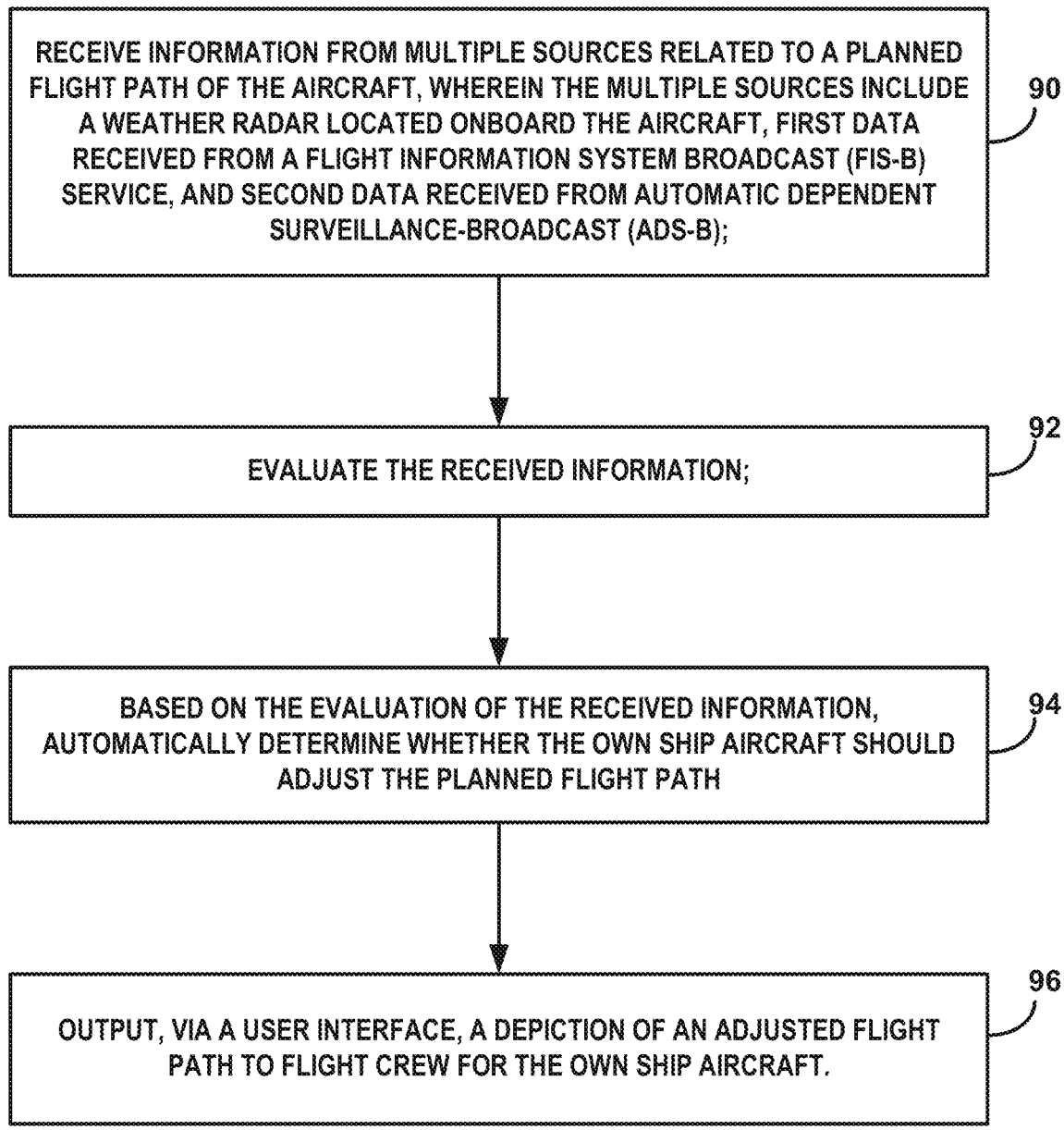
FIG. 4 is a flowchart illustrating an example operation of the systems of this disclosure.

FIG. 4 is a flowchart illustrating an example operation of the systems of this disclosure. Processing circuitry of the systems of this disclosure may execute the steps shown in the blocks of FIG. 4, including processing circuitry onboard an aircraft, e.g., an installed aviation system, or a separate electronic flight bag, as well as processing circuitry of a computing device on another vehicle or ground station, such as for a UAV.

As described above in relation to FIGS. 1-3, the processing circuitry, e.g., processing circuitry 220 of FIG. 2, may receive information from multiple sources related to a planned flight path of an aircraft (90). Some examples of such the multiple sources may include a weather radar located onboard the aircraft, data received from a flight information system broadcast (FIS-B) service, data received from automatic dependent surveillance-broadcast (ADS-B), sensors onboard the own ship aircraft comprising: an outside temperature sensor, a turbulence sensor, global positioning system (GPS) and a barometric air pressure sensor and other sources.

The processing circuitry may execute programming instructions, including machine learning, artificial intelligence, and other programming instructions, to evaluate the received information (92). Some examples of evaluation may include cross-checking information from the various sources for consistency and validity, and fusing the received information into a cohesive picture of the conditions for the planned flight path, and alternative flight paths.

Based on the evaluation of the received information, the processing circuitry may automatically determine whether the own ship aircraft should adjust the planned flight path (94). In some examples, as described above in relation to FIGS. 1-3, the processing circuitry may receive, e.g., via ADS-B, a track information for dozens or hundreds of other aircraft. In some examples, the other aircraft are located in a 3D region of airspace through which the own ship planned flight path passes. In some examples, the other aircraft are on the same or similar flight trajectory, but may have departed earlier than the own ship aircraft. The processing circuitry may also continually receive minute by minute updates on the large number of other aircraft whose flight path information may be useful to the own ship aircraft.

The processing circuitry may automatically determine whether the track for the second aircraft is a deviation from an original track for the second aircraft and determine whether the own ship aircraft should adjust the planned flight path based on the determined deviation for the second aircraft, as described above in relation to FIG. 1. The processing circuitry may output, e.g., via a user interface, a depiction of the adjusted flight path to flight crew for the own ship aircraft.

In one or more examples, the functions described above may be implemented in hardware, software, firmware, or any combination thereof. For example, the various components of FIG. 2, such as processing circuitry 220, may be implemented in hardware, software, firmware, or any combination thereof. If implemented in software, the functions may be stored on or transmitted over, as one or more instructions or code, a computer-readable medium and executed by a hardware-based processing unit. Computer-readable media, e.g., memory 222 of FIG. 2, may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The term "non-transitory" may indicate that the storage medium is not embodied in a carrier wave or a propagated signal. In certain examples, a non-transitory storage medium may store data that can, over time, change (e.g., in RAM or cache). By way of example, and not limitation, such computer-readable storage media, may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor" and "processing circuitry," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The techniques of this disclosure may also be described in the following examples.

Example 1: A system comprising an own ship aircraft; a weather radar configured to be installed on board an own ship aircraft; processing circuity for the own ship aircraft having access to a storage device, the processing circuitry and storage device configured to: receive, from multiple sources, information related to a planned flight path of the own ship aircraft, wherein the multiple sources include the weather radar, first data received from a flight information system broadcast (FIS-B) service, and second data received from automatic dependent surveillance-broadcast (ADS-B); evaluate the received information; based on the evaluation of the received information, automatically determine whether the own ship aircraft should adjust the planned flight path; output, via a user interface, a depiction of an adjusted flight path to flight crew for the own ship aircraft.

Example 2: The system of example 1, wherein the processing circuitry is further configured to: convert the received first data and second data into a common interim data format; evaluate the received information based on the common interim data format.

Example 3: The system of any of examples 1 and 2, wherein the processing circuitry is further configured to output an indication to the flight crew of an information source upon which the adjusted flight path is based, wherein the weather information source comprises: fusion, FIS-B, ADS-B, satellite based weather information, or own ship weather sensors.

Example 4: The system of any of examples 1 through 3, wherein the multiple sources further include sensors onboard the own ship aircraft comprising an outside temperature sensor, a turbulence sensor, global positioning system (GPS) and a barometric air pressure sensor.

Example 5: The system of any of examples 1 through 4, wherein the processing circuitry is further configured to: receive, via ADS-B, a track for a second aircraft different from the own ship aircraft; determine whether the track for the second aircraft is a deviation from an original track for the second aircraft; determine whether the own ship aircraft should adjust the planned flight path based on the determined deviation for the second aircraft.

Example 6: The system of example 5, wherein the second aircraft is located in a 3D region of airspace through which the own ship planned flight path passes.

Example 7: The system of any of examples 5 and 6, wherein the second aircraft is on the same or similar flight trajectory.

Example 8: The system of example 7, wherein the second aircraft is on a heading approximately opposite to an own ship aircraft heading.

Example 9: A method comprising receiving, by processing circuitry for an aircraft, information from multiple sources related to a planned flight path of the aircraft, wherein the multiple sources include a weather radar located onboard the aircraft, first data received from a flight information system broadcast (FIS-B) service, and second data received from automatic dependent surveillance-broadcast (ADS-B); evaluating the received information; based on the evaluation of the received information, automatically determining whether the own ship aircraft should adjust the planned flight path; and outputting, via a user interface, a depiction of an adjusted flight path to flight crew for the own ship aircraft.

Example 10: The method of example 9, further comprising converting, by the processing circuitry, the received first data and second data into a common interim data format; evaluating, by the processing circuitry, the received information based on the common interim data format.

Example 11: The method of any of examples 9 and 10, further comprising outputting, by the processing circuitry, an indication to the flight crew of an information source upon which the adjusted flight path is based, wherein the weather information source comprises: fusion, FIS-B, ADS-B, satellite based weather information, or own ship weather sensors.

Example 12: The method of any of examples 9 through 11, wherein the multiple sources further include sensors onboard the own ship aircraft includes an outside temperature sensor, a turbulence sensor, global positioning system (GPS) and a barometric air pressure sensor.

Example 13: The method of any of examples 9 through 12, further comprising receiving, via ADS-B, a track for a second aircraft different from the own ship aircraft; determining whether the track for the second aircraft is a deviation from an original track for the second aircraft; determining whether the own ship aircraft should adjust the planned flight path based on the determined deviation for the second aircraft.

Example 14: The method of example 13, wherein the second aircraft is located in a 3D region of airspace through which the own ship planned flight path passes.

Example 15: The method of any of examples 13 and 14, wherein the second aircraft is on the same or similar flight trajectory.

Example 16: The method of example 15, wherein the second aircraft is on a heading approximately opposite to an own ship aircraft heading.

Example 17: A non-transitory computer-readable storage medium comprising instructions that, when executed, cause processing circuitry of a computing device to receive information from multiple sources related to a planned flight path of the aircraft, wherein the multiple sources include a weather radar located onboard the aircraft, first data received from a flight information system broadcast (FIS-B) service, and second data received from automatic dependent surveillance-broadcast (ADS-B); evaluate the received information; based on the evaluation of the received information, automatically determine whether the own ship aircraft should adjust the planned flight path; and output, via a user interface, a depiction of an adjusted flight path to flight crew for the own ship aircraft.

Example 18: The non-transitory computer-readable storage medium of example 17, further comprising convert the received first data and second data into a common interim data format; evaluate the received information based on the common interim data format.

Example 19: The non-transitory computer-readable storage medium of any of examples 17 and 18, wherein the instructions further cause the processing circuitry to receive, via ADS-B, a track for a second aircraft different from the own ship aircraft; determine whether the track for the second aircraft is a deviation from an original track for the second aircraft; determine whether the own ship aircraft should adjust the planned flight path based on the determined deviation for the second aircraft.

Example 20: The non-transitory computer-readable storage medium of example 19, wherein the second aircraft is located in a 3D region of airspace through which the own ship planned flight path passes.

Example 21: The non-transitory computer-readable storage medium of example 19, wherein the instructions further cause the processing circuitry to receive, via ADS-B, a track for a second aircraft different from the own ship aircraft; determine whether the track for the second aircraft is a deviation from an original track for the second aircraft; determine whether the own ship aircraft should adjust the planned flight path based on fused hazard weather on planned flight path.

Various examples of the disclosure have been described. These and other examples are within the scope of the following claims.

What is claimed is:

1. A system comprising:
a weather radar configured to be installed onboard an own ship aircraft;
processing circuitry for the own ship aircraft having access to a storage device, the processing circuitry configured to:
receive, from multiple weather information sources, weather information related to weather along a planned flight path of the own ship aircraft, wherein the weather information comprise weather radar data, first data received from a flight information system broadcast (FIS-B) service, and second data received from an automatic dependent surveillance-broadcast (ADS-B) system;
fuse the received weather information based on confidence priorities of the weather radar data, first data, and second data;
automatically determine whether to adjust the planned flight path for the own ship aircraft based on the fused weather information;
in response to determining to adjust the planned flight path for the own ship aircraft, output, via a user interface, a depiction of an adjusted flight path to flight crew for the own ship aircraft; and
output, via the user interface, an indication to the flight crew of a weather information source upon which the adjusted flight path is based, wherein the weather information source comprises at least one of a fusion of two or more sources, the FIS-B service, the ADS-B system, satellite based weather information, or own ship weather sensors.

2. The system of claim 1, wherein the processing circuitry is further configured to:
convert the received first data and second data into a common interim data format; and
evaluate the received weather information based on the common interim data format.

3. The system of claim 1, wherein the multiple weather information sources further comprise sensors onboard the own ship aircraft, sensors comprising one or more of an outside temperature sensor, a turbulence sensor, a global positioning system (GPS), or a barometric air pressure sensor.

4. The system of claim 1, wherein the processing circuitry is further configured to:
receive, via the ADS-B system, a track for a second aircraft different from the own ship aircraft;
determine whether the track for the second aircraft is a deviation from an original track for the second aircraft; and
determine whether to adjust the planned flight path of the own ship aircraft based on the determined deviation for the second aircraft and the fused weather information that is showing weather conditions on the planned flight path.

5. The system of claim 4, wherein the second aircraft is located in a 3D region of airspace through which planned flight path passes.

6. The system of claim 4, wherein the second aircraft is on a same flight trajectory.

7. The system of claim 4, wherein the second aircraft is on a heading within 90 degrees of an opposite direction of an own ship aircraft heading.

8. A method comprising:
receiving, by processing circuitry for an own ship aircraft, weather information from multiple weather information sources related to weather along a planned flight path of the own ship aircraft, wherein the weather information comprise weather radar data, first data received from a flight information system broadcast (FIS-B) service, and second data received from an automatic dependent surveillance-broadcast (ADS-B) system;
fuse the received weather information based on confidence priorities of the weather radar data, first data, and second data;
automatically determining whether to adjust the planned flight path of the own ship aircraft based on the fused weather information;
in response to determining to adjust the planned flight path for the own ship aircraft, outputting, via a user interface, a depiction of an adjusted flight path to flight crew for the own ship aircraft; and
output, via the user interface, an indication to the flight crew of an information source upon which the adjusted flight path is based, wherein the weather information source comprises at least one of a fusion of two or more sources, the FIS-B service, the ADS-B system, satellite based weather information, or own ship weather sensors.

9. The method of claim 8, further comprising:
converting, by the processing circuitry, the received first data and second data into a common interim data format; and
evaluating, by the processing circuitry, the received information based on the common interim data format.

10. The method of claim 8, wherein the multiple weather information sources further comprise sensors onboard the own ship aircraft, the sensors comprising: an outside temperature sensor, a turbulence sensor, global positioning system (GPS) or a barometric air pressure sensor.

11. The method of claim 8, further comprising:
receiving, via the ADS-B system, a track for a second aircraft different from the own ship aircraft;
determining whether the track for the second aircraft is a deviation from an original track for the second aircraft; and
determining whether to adjust the planned flight path for the own ship aircraft based on the determined deviation for the second aircraft and the fused weather information that is showing weather conditions on the planned flight path.

12. The method of claim 11, wherein the second aircraft is located in a 3D region of airspace through which the planned flight path passes.

13. The method of claim 11, wherein the second aircraft is on a same flight trajectory.

14. The method of claim 11, wherein the second aircraft is on a heading within 90 degrees of an opposite direction of an own ship aircraft heading.

15. A system comprising:
a weather radar configured to be installed onboard an own ship aircraft;
processing circuitry for the own ship aircraft having access to a storage device, the processing circuitry configured to:
receive, from multiple sources, weather information related to a planned flight path of the own ship aircraft, wherein the weather information includes at least two or more of first weather data received from an onboard weather radar, second weather data received from a flight information system broadcast (FIS-B) service, and third weather data received from an automatic dependent surveillance-broadcast (ADS-B) system;
fuse the received weather information based on confidence priorities of the first weather data, the second weather data, and the third weather data;
determining, based on the fused weather information, weather condition present in the planned flight path;
receive, via the ADS-B system, a track for a second aircraft different from the own ship aircraft;
determine an amount of deviation between the track for the second aircraft and an original track for the second aircraft;
determine whether to adjust the planned flight path of the own ship aircraft based on the amount of deviation and the fused weather information; and
in response to determining to adjust the planned flight path for the own ship aircraft, output, via a user interface, a depiction of an adjusted flight path to flight crew for the own ship aircraft; and
output, via the user interface, an indication to the flight crew of the fused weather information upon which the adjusted flight path is based.

16. The system of claim 15, wherein the second aircraft is located in a 3D region of airspace through which the planned flight path passes.

17. The system of claim 15, wherein the second aircraft is on a same flight trajectory.

18. The system of claim 15, wherein the second aircraft is on a heading within 90 degrees of an opposite direction of an own ship aircraft heading.

\* \* \* \* \*